F. J. TROLL.
LOAD INDICATOR FOR MOTOR TRUCKS.
APPLICATION FILED JULY 20, 1917.
Reissued May 21, 1918.
14,475.
2 SHEETS—SHEET 1.
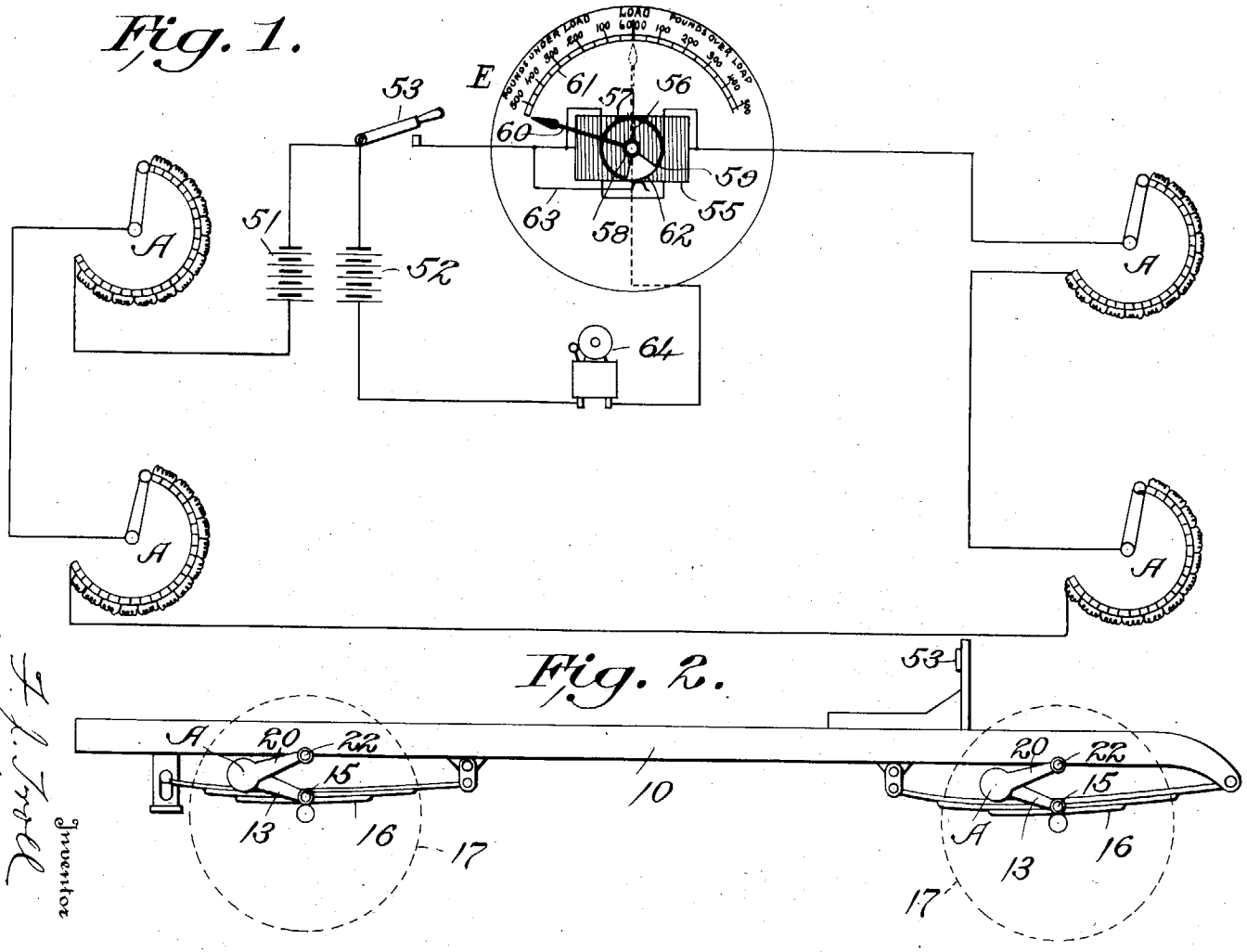
Inventor
F. J. Troll
By
Attorney

F. J. TROLL.

LOAD INDICATOR FOR MOTOR TRUCKS.

APPLICATION FILED JULY 20, 1917.

Reissued May 21, 1918.

14,475.

2 SHEETS—SHEET 2.

Inventor

F. J. Troll

By

Attorney

UNITED STATES PATENT OFFICE.

FREDERICK J. TROLL, OF BALTIMORE, MARYLAND, ASSIGNOR TO THE LOADOMETER COMPANY, OF BALTIMORE, MARYLAND, A CORPORATION OF DELAWARE.

LOAD-INDICATOR FOR MOTOR-TRUCKS.

14,475. Specification of Reissued Letters Patent. Reissued May 21, 1918.

Original No. 1,147,127, dated July 20, 1915, Serial No. 698,250, filed May 18, 1912. Application for reissue filed July 20, 1917. Serial No. 181,913.

*To all whom it may concern:*

Be it known that I, FREDERICK J. TROLL, a citizen of the United States, residing at Baltimore, and State of Maryland, have invented certain new and useful Improvements in Load-Indicators for Motor-Trucks, of which the following is a specification.

This invention relates to a combined load indicator and alarm for motor trucks, and may be termed a "loadometer."

Motor trucks are sometimes equipped with a sign disposed at some convenient point on the vehicle to indicate the pound capacity thereof. Warnings are also located on the vehicle to the effect that it should not be loaded to an extent beyond its rated carrying capacity, say for instance, 6000 pounds. The reason for such notices and warnings is that overloads place the truck under unnecessary strain and impair the life of the truck. A cautious driver, in some instances, in order to be on the safe side may underload the truck thereby reducing the operative efficiency by increasing the unit cost per pound of the materials handled. Careless drivers are likely to overload the truck thereby increasing the repair cost, tire expense, etc., with the result that from the manufacturer's view point, the reputation of the truck is affected to the disadvantage of the manufacturer by reason of complaints from owners or purchasers of motor trucks.

It is therefore one object of my invention to provide an apparatus particularly adapted to be associated with a motor truck which will indicate the underload and overload in units of one hundred pounds more or less so that the rated capacity of the truck will not be abused and so that the operating efficiency will not be reduced because of failure to load the truck to its rated capacity.

Another object resides in the provision of an electro-mechanical means which may be readily applied to any motor truck without alterations to the latter and which will effectively operate so that the full load may always be carried and an overload or underload always known to the driver or other attendant.

The invention also aims to combine with a vehicle, indicating means disposed in the most advantageous position, both for observation and not to be in the way, and indicator actuating means, the latter being located with reference to the body, platform, or load-receiving member and the running gear, so as to be positively actuated by movements of the body, due to the amount of weight placed thereon, without requiring complex parts.

It is still further designed to provide means for application to a motor truck embodying among other characteristics an audible alarm which will sound in the event of the truck reaching its rated capacity and continue to sound until the truck is relieved of its overweight so that the driver will know that to preserve the life of the truck and to discontinue the alarm some of the materials must be removed from the truck in order to decrease the weight on same.

With the above and other objects in view the present invention consists in the combination and arrangement of parts hereinafter more fully described, illustrated in the accompanying drawings and particularly pointed out in the appended claims, it being understood that changes may be made in the form, proportion, size and minor details, without departing from the spirit or sacrificing any of the advantages of the invention.

In the drawings:

Figure 1 is a diagrammatic view of my invention.

Fig. 2 is a side elevation of a truck chassis indicating the application of the visible part of my invention thereto.

Figure 3:
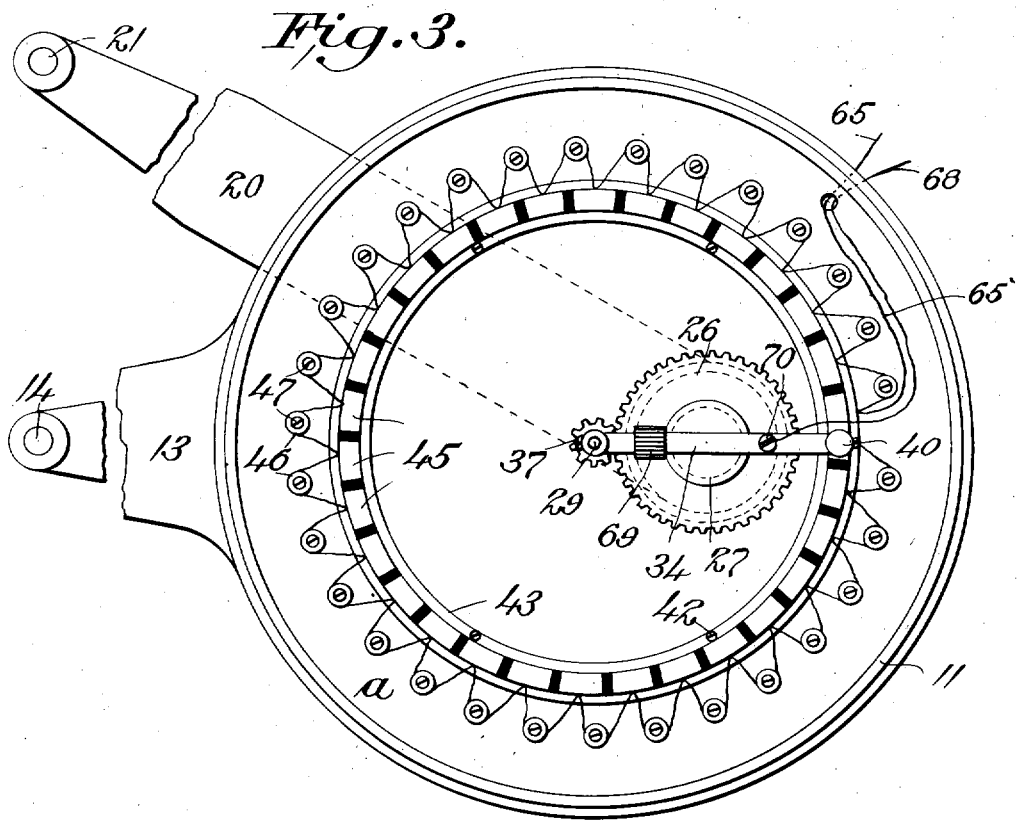
Fig. 3 is a face view of one of the electro-mechanical resistance changing devices, with the closure of the casing removed.
Figure 4:
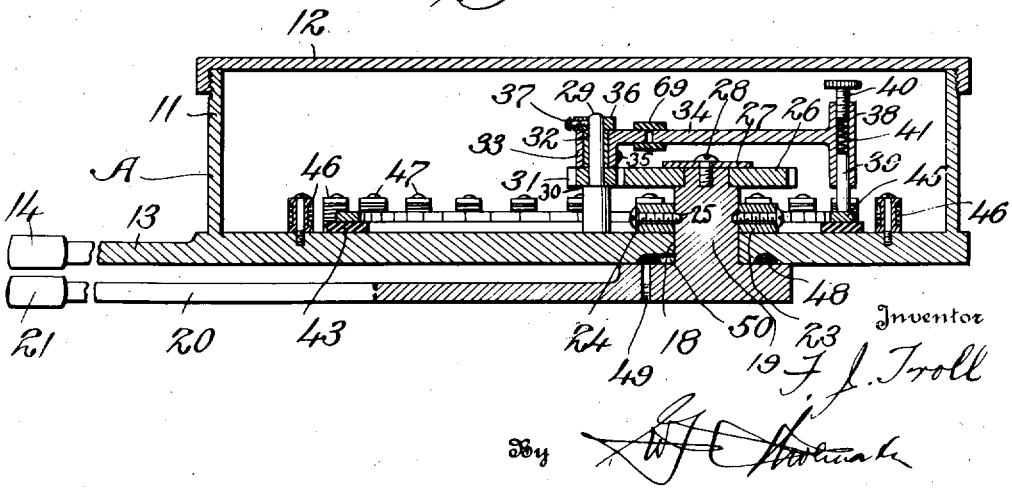
Fig. 4 is a sectional view thereof.

In one embodiment of my invention I employ a plurality of electro-mechanical resistance changing devices preferably four in number, with these resistance changing devices located in close proximity to the ends of the front and rear axles of the vehicle 10. These resistance changing devices are located somewhat after the fashion of a shock absorber and each consists preferably of a casing A composed of two parts 11 and 12, the part 11 forming the body of the casing and having an arm 13 extending therefrom and provided at its outer end with an eye 14 through which may be passed a suitable fastening element 15, to secure the arm 13 to the corresponding elliptical spring 16 arranged adjacent each wheel 17 of the vehicle 10. The part 12 of the casing A is in the form of a cap and preferably has screw threaded engagement with the body of the part 11 to close the casing. One wall of the part 11 is provided with a perforation adapted to form a bearing 18 to receive the axis 19 of the arm 20 which latter is provided at its outer end with an eye 21 through which may be passed a bolt or other suitable element 22 whereby the outer end of the arm 20 may be connected to the framework or body 10 of the vehicle.

To secure the axis 19 of the arm 20 against displacement or accidental withdrawal from its bearing 18 there may be provided a collar 23 located within the casing and embracing the axis and through which collar are passed screws or other suitable elements 24 adapted to fit in a groove 25 in the axis 19 of the arm 20 whereby the axis has rotatable movement in the casing and yet is held against accidental withdrawal therefrom by virtue of the fastening elements 24 fitting in said groove 25. The inner end of the axis 19 is preferably reduced and squared so as to support a gear 26 which is held on the inner end of the axis 19 by means of a collar 27 and set screw 28, respectively.

Mounted in the wall *a* of the casing A in any suitable manner is an arbor 29 which is preferably shouldered at 30 to support a pinion 31 adapted to mesh with the aforesaid gear 26. This pinion 31 has a sleeved portion 32 projecting therefrom and embracing which is the collar 33 and an arm 34. The collar 33 may be held fixedly to the sleeve 32 by means of one or more set screws 35 with the pinion 31 held against longitudinal movement on the arbor 29 by means of a collar 36 secured to the outer end of the arbor 29 by means of a set screw or other suitable fastening 37. The collar 36 and fastening 37 coöperate with the fastenings 35 to maintain the arm 34 in its normal position with relation to the pinion 31.

The arm 34 is preferably composed of two sections, with the inner section insulated from the outer section by means of suitable insulating material 69 and at the outer end of the arm there is formed a sleeve 38 in which is mounted a contact member 39 which is adjustably and yieldably mounted in the sleeve 38 by an adjusting screw 40 and a spring 41, the latter fitting between the adjusting screw 40 and the contact member 39.

Disposed within the casing A and secured to the inner side of the wall *a* by means of screws or other suitable fastenings 42 is a flanged annular insulating ring 43 provided with a plurality of slots to receive a plurality of spaced contacts 45. These contacts 45 are insulated from the casing and each other by the ring 43 and also insulated from each other by the parts of the ring formed between the slots in which the contact pieces are located. These contact pieces 45 are adapted for coöperation with the aforesaid contact member 39 which latter is adapted to successively operate over the contacts 45 according to the weight on the vehicle and the consequent rotation of the gears 26 and pinions 31 under the influence of the arms 20 and 13 of the resistance changing devices which causes swinging movement of the arms 34 of the respective resistance changing devices to move the contact members 39 over the respective contacts 45. To prevent the contact members 39 from breaking the electrical circuit at any point in their rotation, the width of the insulating material between the slots provided to receive the contacts 45, must be made narrower than the contact members 39.

Disposed within the casing and arranged circumferentially with respect to the annular insulating member 43 and exteriorly of the latter in spaced relation thereto is a plurality of electrical resistances 46 whose spools are secured to the inner side of the wall *a* of the casing A preferably by means of screws 47. These electrical resistances 46 are preferably connected in series to the contact members 45 as clearly shown in Fig. 3.

To provide for an efficient lubrication of the journal 19 of the arm 20 there is formed in the outer face of the wall *a* of each casing A an annular groove 48 filled with a suitable packing in which lubricating oil may be injected through a passage 49 from which it may pass through the packing and duct 50 to the journal to lubricate the same.

The electro-mechanical resistance changing devices are electrically connected in series to a common source of electric supply, such for instance, as dry cells, or the batteries generally utilized for ignition or an electrical storage battery of electric trucks, as indicated at 51. This circuit which will be hereinafter termed the resistance changing circuit comprises the plurality of resistance changing devices, the battery 51, the switch 53 and the indicator E, which latter is preferably of the milliammeter type. This indicator consists of a stationary coil 55, a movable coil 56 connected in multiple with coil 55, a rotating contact 57, which is electrically connected to the axis 58 of the instrument and located in an insulated collar or ring 59. There is a pointer or index finger 60 carried by the axis 58 of the instrument which works over the dial 61 on which dial may be graduations and indications on opposite sides of the rated capacity of say for instance six thousand pounds. The instrument also has a thin contact or brush 63 insulated from same adapted to coöperate with the rotatable contact 57 at a predetermined time as will be hereinafter explained, to cause a current of electricity to flow through a second circuit electrically connected with the resistance changing circuit and which may be termed the alarm circuit for the purpose of sounding the alarm to audibly indicate that the maximum capacity of the truck has been reached. The alarm circuit is connected with the resistance changing circuit and with the indicator, the alarm being indicated at 64.

As it is essential that a constant voltage be maintained in the resistance changing circuit which is supplied by the batteries or source of supply 51, and whose voltage would be appreciably lowered if the current were taken from source 51 to operate the alarm 64; an extra source of current 52 is therefore provided.

The resistance circuit may be connected up with the respective resistance changing devices by the means of an entering wire 65 which may lead through an opening 66 in the corresponding casing A and connect to one of the contact pieces 45. The current flows up through the contact member 39 and the arm 34 to the binding post 70 and out through the outgoing flexible wire 68 which also passes through the aforesaid opening 66 in the respective casing A.

The operation of the apparatus may be stated as follows: When about to load the truck the switch 53 on the dash board is closed. As the materials are placed on the truck the same is depressed and the springs 16 gradually flatten. Under the flattening action of the spring 16, the outer ends of the arms 13 and 20 are forced together or toward each other under the depression of the body of the vehicle. This causes the axis 19 of the arm 20 of the electro-mechanical resistance devices to rotate and with them the respective gears 26 and pinions 31. The gears 26 being in mesh with the pinions 31 the latter are rotated and cause swinging of the arms 34 in the resistance changing devices. As the arms 34 rotate the corresponding contacts 39 carried thereby are carried over the contacts 45. By the multiplying effect of the gears 26 and the cooperating pinions 31 electrical resistance is cut out of the resistance changing device circuit according to the amount of depression of the vehicle body caused by the load. In other words, if the load be equally distributed throughout, the amount of resistance cut out in each resistance changing device is substantially the same. If a heavy machine or other heavy concentrated load, or if for any other reason any preponderance of load is placed at either the extreme front or back or side of the truck, causing two of the springs to be depressed more than the other two and consequently but two of the resistance devices acted upon to any appreciable extent, causing resistance to be cut out of the resistance changing device circuit, the indicator E would register the load, because the proper amount of resistance, corresponding to the load, is cut out of the resistance changing device circuit by virtue of the sum of the vertical movements or depressions of the two springs being equal to the sum of the vertical movements or depressions of all four of the springs, if the load had been so applied as to cause all four of the springs to be depressed. Upon the vehicle receiving the predetermined amount in weight of goods or, in other words, its maximum weight capacity, the stationary coil 55 of the indicating instrument E will be sufficiently energized to move the movable coil 56 to which the index finger 60 is connected, thus causing the index finger 60 to pass over the dial 61 and indicate the load on the truck. When the load has reached anywhere within, say for instance five hundred pounds of the maximum weight capacity, the operator, may tell by the indicator that he is nearing the maximum rated capacity. In any event, as further load is placed on the truck more and more resistance is cut out of the resistance changing device circuit and when a point is reached where the maximum predetermined current is passing through the indicating instrument E, switch 53, and the resistance devices, it causes the index finger 60 to reach the dotted line position in Fig. 1, that is to say, directly over the six thousand pound mark on the indicator, if the rated capacity be six thousand pounds. The rated capacity of the truck may be changed if desired. For instance, on the dial 61 of the indicator E, and for example, 6 of the 6000 load mark could be changed to 4, making it a 4000 pound loadometer instead of a 6000 pound. By these changes one type and size of loadometer could be used on any size or capacity of motor truck. When the index finger 60 reaches the dotted line position shown in Fig. 1, that is to say, when the maximum capacity has been reached, the insulated brush 63 of the indicating instrument E comes into contact with the contact segment 57, thus completing the circuit through the battery 52, switch 53, the contact segment 57, the axis 58 of the instrument the metal frame 62 of the instrument, and also through the alarm 64 by way of the supplemental battery 52, thus causing the alarm to sound. The alarm will continue to sound until the load is decreased on the truck, and as the load is decreased more or less resistance is cut into resistance changing circuit, thereby, slightly demagnetizing the stationary coil 55, permitting or causing the contact segment 57 to be rotated out of the path of the insulated contact brush 63, breaking the electrical connection to the alarm. In the event of a weakening of the springs 16 causing the springs to be depressed or flattened out of their normal condition, when no load is on the truck, thus causing the contact arms 34 to be shifted from their normal operative positions and thereby accidentally cutting out resistance when none should be cut out, it is simply necessary to remove the cover parts 12 of the casing A of the resistance changing devices and then properly adjust the contact arms 34, by loosening the set screws 35 and subsequently tightening the same, after which the cover part 12 is placed on the casing A.

What is claimed is:—

1. The combination of the axles, body and wheels of a vehicle, supporting springs adjacent to each wheel, electro-mechanical resistance changing devices connected to the body and the spring at each end of each axle, electrical means connected to the resistance devices and operable under the influence of the latter to indicate the maximum load capacity of the vehicle, and means audibly indicating when the aforesaid indicating means has been operated to indicate the maximum load capacity.

2. The combination of the axles, body and wheels of a vehicle, supporting springs adjacent to each wheel, electro-mechanical resistance changing devices connected to the body and spring at each end of each axle, and electrical means common to all of the resistance devices and operable under the influence of the latter to indicate when the maximum load capacity of the vehicle has been reached.

3. The combination with the axles, body and wheels of a vehicle, supporting springs adjacent to each wheel, electro-mechanical resistance changing devices having connection with the spring for operation under the action of the latter and arranged one at each end of each axle, and means connected to the electro-mechanical resistance changing devices and operable under the influence of the latter to indicate when the maximum load capacity of the vehicle has been reached.

4. The combination of the axles, body and wheels of a vehicle, supporting springs between the axles and the body of the vehicle, electro-mechanical resistance changing devices having connection with said springs for operation under the influence of flattening of said springs incident to weight on the body of the vehicle, and electrical means electrically connected to the resistance changing devices and operable under the influence of the latter to sound an alarm when the maximum capacity of the vehicle has been reached.

5. The combination of the axles, body and wheels of a vehicle, supporting springs between the axles and the body of the vehicle, resistance changing devices having connection with the springs for operation when the body is depressed incident to a load placed thereon, and electrical means electrically connected to the resistance changing devices to sound an alarm when the maximum load capacity of the vehicle has been reached.

6. The combination of the axles, body, and wheels of a vehicle, supporting springs between the axles and the body, resistance changing devices having connection with the springs for operation upon flattening of the latter incident to weight placed on the body, and a common means connected to all of the resistance changing devices to indicate the weight of the load placed on the vehicle and to indicate when the maximum load capacity has been reached.

7. The combination of the axles, body and wheels of a vehicle, supporting springs between the axles and the body, resistance changing devices having connection with the springs for operation upon flattening of the latter incident to weight placed on the body, and a common means connected to all of the resistance changing devices to indicate the weight of the load placed on the vehicle, and an alarm connected to said electrical means to audibly indicate when the maximum load capacity of the vehicle has been reached.

8. The combination of the axles, body and wheels of a vehicle, supporting springs between the axles and the body of the vehicle, electro-mechanical resistance changing devices connected one to each of the springs, each resistance device comprising a casing, a plurality of contact members within each casing insulated from the latter and from one another, a plurality of resistance changing devices connected in series to the contact members, a swinging contact arm mounted in the casing and carrying a contact member for successive engagement with said contact members, a gear mechanism whereby the swinging contact arm is swung step by step under the influence of weight on the vehicle body, a resistance changing electric circuit having connection with each resistance changing device and including a battery and a switch and an indicator in said circuit to indicate when the maximum load capacity of the vehicle has been reached, and an alarm circuit operatively connected to the aforesaid circuit and including a battery and an alarm which latter is operable to audibly indicate when the maximum load capacity of the vehicle has been reached.

9. The combination of the axles, body and wheels of a vehicle, supporting springs between the axles and the body of the vehicle, electro-mechanical resistance changing devices having connection with the springs for operation when the body is depressed incident to a load placed thereon, an electric resistance changing circuit in which said electro-mechanical resistance changing devices are connected in series and including a battery, switch and an indicator to indicate the amount of load placed on the vehicle, and an alarm circuit connected to the indicator and the aforesaid circuit and including a battery and an alarm to sound the latter upon a predetermined amount of resistance being cut out of the first named circuit incident to load on the vehicle.

10. The combination of the axles, body and wheels of a vehicle, supporting springs between the axles and the body of the vehicle, electro-mechanical resistance changing devices having connection with the springs for operation when the body is depressed incident to a load placed thereon, an electrical resistance changing circuit in which said electro-mechanical resistance changing devices are connected in series and including a battery, switch and an indicator to indicate the amount of load placed on the vehicle, and an alarm circuit connected to the indicator and the aforesaid circuit and including a battery and an alarm to sound the latter upon a predetermined amount of resistance being cut out of the first-named circuit incident to load on the vehicle, the battery of the alarm circuit furnishing an independent source of current to sound the alarm independently of the battery of the resistance changing circuit.

11. The combination of a vehicle body, electro-mechanical resistance changing devices operable under the influence of the load placed on the vehicle body, an electric resistance changing circuit in which said electro-mechanical resistance changing devices are connected in series and including a battery, switch and an indicator to visibly indicate the amount of load placed on the vehicle, and an alarm circuit connected to the indicator and to the aforesaid circuit and including a battery and an alarm to audibly indicate when a predetermined amount of resistance has been cut out of the first-named circuit incident to load on the vehicle body.

12. The combination of a vehicle body which is subject to depression, resistance changing devices operable under the influence of the vehicle body when depressed incident to load placed thereon, a common means connected to all of the resistance changing devices to visibly indicate the weight or load placed on the vehicle body, and means operatively connected to the visible indicating means to audibly indicate when the visible indicating means operates to indicate the amount of load placed on the vehicle body.

13. The combination of a vehicle including a body, means to yieldingly support the body, a resistance changing circuit carried by the vehicle, means for changing the resistance in said circuit proportionate to the load, a visible indicator connected in said circuit, the indicator being controlled according to the electrical variations in the resistance changing circuit incident to operation of the resistance changing means upon depression of the vehicle body against the action of said yieldable supporting means, and an electric alarm circuit electrically connected to the resistance changing circuit and controlled thereby so as to audibly indicate simultaneously with the visible indication when the predetermined load capacity of the vehicle has been reached.

14. The combination of the axles, body and wheels of a vehicle, supporting springs between the axles and the body of the vehicle, resistance changing devices connected one to each of the springs, each resistance device comprising a casing, a plurality of contact members within each casing insulated from the latter and from one another, a plurality of resistance devices connected in series to the contact members, a swinging contact arm mounted in the casing and carrying a contact member for successive engagement with said contact members, means whereby the swinging contact arm is swung step by step under the influence of weight on the vehicle body, and an indicator electrically connected to each of said electro-mechanical resistance changing devices to indicate when the rated capacity of the vehicle has been reached.

15. The combination of the axles, body and wheels of a vehicle, supporting springs between the axles and the body of the vehicle, resistance changing devices connected one to each of the springs, each resistance device comprising a casing, a plurality of contact members within each casing insulated from the latter and from one another, a plurality of resistance devices connected in series to the contact members, a swinging contact arm mounted in the casing and carrying a contact member for successive engagement with said contact members, means whereby the swinging contact arm is swung step by step under the influence of weight on the vehicle body, an indicator electrically connected to each of said electro-mechanical resistance changing devices to indicate when the rated capacity of the vehicle has been reached, and means operating simultaneously with the aforesaid indicating means to indicate audibly when the predetermined rated capacity has been reached.

16. The combination with a vehicle, electro-mechanical resistance changing devices having operative connection with the body for operation upon depression of the latter incident to weight placed on the body, each resistance changing device comprising a casing, a plurality of resistances in each casing connected in series to the respective contact members, a swinging contact arm mounted in the casing and carrying a contact member for engagement with said contact members, a gear mechanism whereby the swinging contact arm is swung step by step under the influence of weight on the vehicle body, and a resistance changing electric circuit having connection with each resistance changing device and including a battery and a switch, and an indicator in said circuit to indicate when the maximum load capacity of the vehicle has been reached.

17. The combination with a vehicle, electro-mechanical resistance changing devices having operative connection with the body for operation upon depression of the latter incident to weight placed on the body, each resistance changing device comprising a casing, a plurality of resistances in each casing, connected in series to the respective contact members, a swinging contact arm mounted in the casing and carrying a contact member for engagement with said contact members, a gear mechanism whereby the swinging contact arm is swung step by step under the influence of weight on the vehicle body, and a resistance changing electric circuit having connection with each resistance changing device and including a battery and a switch, and an indicator in said circuit to indicate when the maximum load capacity of the vehicle has been reached, and an alarm circuit operatively connected to the aforesaid circuit and including a battery and an alarm which latter is operable to audibly indicate when the maximum load capacity of the vehicle has been reached.

18. The combination with a vehicle, electro-mechanical resistance changing devices having operative connection with the body for operation upon depression of the latter incident to weight placed on the body, each resistance changing device comprising a casing, a plurality of contact members within each casing, a plurality of resistances in each casing connected in series to the respective contact members, a swinging contact arm mounted in the casing and carrying a contact member for engagement with said contact members, a gear mechanism whereby the swinging contact arm is swung step by step under the influence of weight on the vehicle body, and an indicator to visibly indicate when the maximum load capacity of the vehicle has been reached.

19. The combination with a vehicle, electro-mechanical resistance changing devices having operative connection with the body for operation upon depression of the latter incident to weight placed on the body, each resistance changing device comprising a casing, a plurality of contact members within each casing, a plurality of resistances in each casing connected in series to the respective contact members, a swinging contact arm mounted in the casing and carrying a contact member for engagement with said contact members, a gear mechanism whereby the swinging contact arm is swung step by step under the influence of weight on the vehicle body, an indicator to visibly indicate when the maximum load capacity of the vehicle has been reached, and means coöperating with the visibly indicating means to audibly indicate when the maximum load capacity of the vehicle has been reached.

20. The combination of a vehicle including a body, means for yieldably supporting the body, an electrical circuit carried by the vehicle body, an indicating means connected in said circuit, overlapping members connected to the vehicle body and to the yieldably supporting means therefor and which are adapted to fold with relation to each other upon depression of the vehicle body against the action of said springs, and contact members having connection with said overlapping and foldable members and included in said circuit and which are arranged to contact with each other upon folding of said overlapping and foldable connections between the body and yieldable supporting means when the body is depressed against the action of the yieldable supporting means and thereby operate said indicating means.

21. The combination of a vehicle including a yieldably supported body, a resistance changing circuit carried by the vehicle, an electro-mechanical resistance changing device arranged in the said circuit and connected with the body of the vehicle and operated by the movement of the body under the influence of a load, and an indicator also connected in said circuit and controlled by the resistance changing device.

22. The combination of a vehicle including a yieldably supported body, a resistance changing circuit carried by the vehicle, a plurality of electro-mechanical resistance changing devices located at spaced points and arranged in the said circuit and connected with the body of the vehicle and operated by the movement of the body under the influence of a load, and an indicator also connected in said circuit and controlled by the resistance changing devices.

In testimony whereof I hereunto affix my signature, this 19th day of July, 1917.

FREDERICK J. TROLL.